March 23, 1948.
J. B. CASTNER
2,438,204
NITRATION APPARATUS
Original Filed June 10, 1943
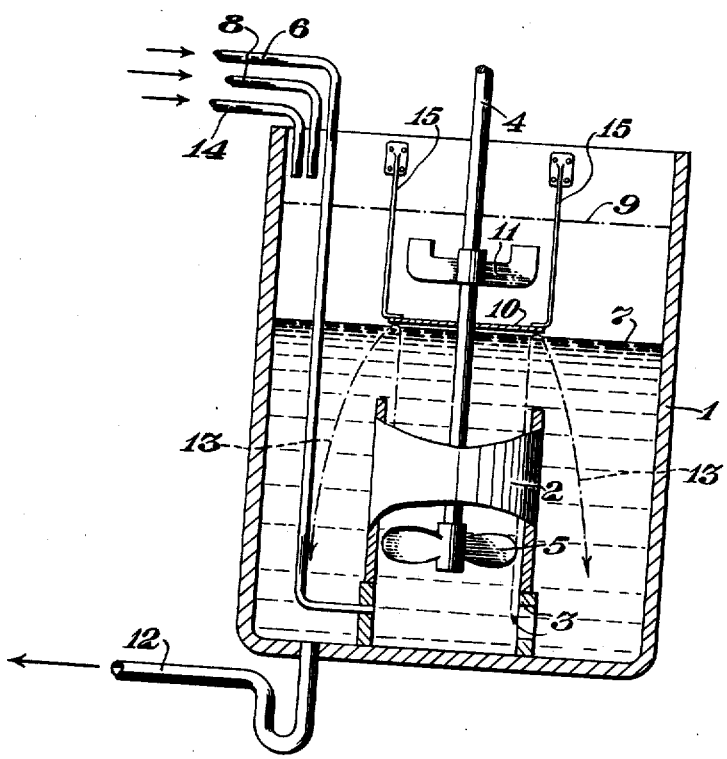
  INVENTOR.
BY *[signature]*
ATTORNEY Patented Mar. 23, 1948

2,438,204

UNITED STATES PATENT OFFICE 2,438,204

NITRATION APPARATUS

James B. Castner, Wilmington, Del., assignor to E. I. du Pont de Nemours & Company, Wilmington, Del., a corporation of Delaware Original application June 10, 1943, Serial No. 490,285. Divided and this application February 8, 1945, Serial No. 576,851

1 Claim. (Cl. 23—252)

This invention relates to an improved nitration process and more particularly to the preparation of nitrated organic compounds where careful control of conditions is essential in order to obtain the desired product.

This is a divisional application of the parent copending application, Serial No. 490,285, filed June 10, 1943, now Patent No. 2,385,128.

Nitration is the term generally applied to the reaction of nitric acid or nitrogen oxides with hydrocarbons or their derivatives where there is introduction of an —NO₂ group into the molecule. When this NO₂ group becomes attached directly to a carbon atom, the compound is a true nitro compound; when it is attached to an oxygen atom, the compound is a nitric ester. The nitric acid employed for nitrations may be used by itself in any desired concentration or, as it more frequently the case, in mixture with sulfuric acid.

The prior art nitration procedures have given generally satisfactory results in cases where a definite final compound is the invariable product. In some cases, however, several stages of nitration are possible, with introduction of one, two or three nitro groups into this molecule. In the nitration of toluene, for example, the mono-nitro-, dinitro-, and trinitro-compounds may be obtained, depending on acid composition and temperature conditions. Even in the preparation of trinitrotoluene, however, the nitration is ordinarily carried out in three stages. Because of the ease of nitration of the lower nitrocompounds, difficulty has been encountered in preparing the mononitro-derivative of toluene and other compounds capable of varying stages of nitration.

The object of my invention is an improved method of nitration particularly applicable to the preparation of products of a low order of nitration, where higher stages are possible. A further object is a method for the preparation of mononitro-compounds. A still further object is such a method where control of the degree of nitration is attained by regulated contact of the reacting materials. A further object is an apparatus assembly for carrying out such a process. Additional objects will be disclosed as the invention is described more at length hereinafter.

I have found that the foregoing advantages are accomplished, and the disadvantages of the prior art overcome, when I proceed in accordance with my invention. I maintain the reacting materials, namely the nitration acid and the material to be nitrated, in separate layers, the material or nitration being superposed on the acid but in nonmiscible relationship therewith. The two bodies of liquid are agitated separately, sufficiently to insure thorough mixing within the individual layers but insufficiently to cause any substantial intermixture of the two layers. Nitration takes place, therefore, at the contact area of the two liquids; hence, nitration beyond the desired degree can be readily avoided.

The functioning of my improved method will be seen more readily by reference to the accompanying drawing which is a vertical elevation cutaway of a nitrator arranged to carry out the process. By way of a specific embodiment, the preparation of mononitrotoluene will be described with reference to this drawing.

In said drawing, 1 represents a nitration vessel of acid-resistant material having within it and approximately in the center thereof a sleeve-like vessel 2 of cylindrical or other shape, held at a distance above the bottom of the nitrator by means of supports 3. This is open at the top and bottom so that free circulation of liquid therethrough is possible. Within the sleeve, an agitator 5 revolves, supported on shaft 4, the blades of the agitator being so designed that it tends to pump liquid upward within the sleeve. About 7,000 pounds of an acid mixture representing a spent acid resulting from the preparation of a similar charge of previously prepared mononitrotoluene is introduced into the nitrator through 14, this acid having a composition of approximately 73% sulfuric acid and 0.75% nitric acid and being at a temperature of 100 to 110° F. Slow agitation is maintained during the introduction of the above acid. Two thousand nine hundred pounds of toluene are then run into the nitrator through 8, the speed of agitation being increased after all has been added. A fortifying mixed acid is introduced slowly through 6, in the amount of about 92000 pounds, this acid having an approximate composition of 69% H₂SO₄ and 23% HNO₃. This fortifying acid is introduced under the surface of the acid present in the nitrator in such position that the upward current in the sleeve causes said acid to pass up therethrough. The dotted lines 13 show the general direction of acid circulation. During the nitration the temperature is kept below 150° F. at all times by means of cooling coils (not shown) in the nitrator. While fortifying acid is being introduced continuously into the nitrator through 6, the spent cycle acid is being drawn out through 12 in such amount that the level of the acid remains practically constant at 7. The upper level of the toluene is seen at 9.

With the apparatus as shown in the drawing and the addition procedure just described, the agitator 5 within sleeve 2 causes continuous mixture of the body of acid and upward circulation of the added fortifying acid. The acid and the toluene, however, remain in separate layers so that nitration takes place only at the contact area of the two layers. The agitator 5 effects mixture of the acid layer. A separate agitator 11 causes the toluene layer to become thoroughly mixed, along with its increasing content of mononitrotoluene as the nitration progresses. A deflector plate 10, positioned above the top of the sleeve and slightly above the upper level of the acid layer, and supported from above as shown at 15, aids in maintaining separation of the layers. The combination of separate agitation in the different liquid layers with the deflector plate insures that nitration proceeds efficiently, due to the continual movement of fresh material to the restricted nitration area; at the same time, emulsification between the two layers is avoided, as well as over-nitration, charring, and the like. The reaction time allowed after the completion of acid addition was approximately five minutes, and excellent yield and quality of product were obtained. The mononitrotoluene, after removal of the recoverable spent acid, may be neutralized and separated for any desired purpose, or may be nitrated further to the dinitrocompound. The spent acid drawn off during the addition of fortifying acid is suitable for subsequent use as cycle acid in other similar nitrations.

The foregoing example shows the procedure according to my invention as applied to the nitration of toluene. It will be understood that it is applicable for use in all nitrations where severe conditions are to be avoided. Its particular value will be in the low stage nitration of organic materials where several nitration stages are possible and where it is desired to avoid overnitration and oxidation or charring due to contact of the starting material with fresh acid of too high strength. The method will be especially suitable for the nitration of toluene, benzene, xylene, chlorobenzene, mononitrotoluene, and other such compounds which are in the liquid state at the temperature of nitration.

The improved procedure according to the invention constitutes a decided advance in the art, inasmuch as it allows the efficient nitration of compounds of the type mentioned and avoids the complications that heretofore have entered into the procedures. It will be understood that the invention is applicable whether mixed acid be employed for nitration or nitric acid alone, of any desired concentration. The advantages include (1) a more uniform acid composition where the procedure involves the introduction into the nitrator initially of a relatively large volume of acid of low nitric content, (2) improved temperature control and consequently fewer adjustments of acid feed rate and cooling water admission, (3) reduction of fume inflammability hazards and possible losses of the nitratable material by volatilization because of the partial pressure lowering of the toluene or other material, due to its mixing into the nitrated phase, and the advantage already emphasized of greatly enhanced control of the degree of nitration.

The invention has been described in full in the foregoing. It will be understood, however, that many changes may be introduced in details of procedure, sequence of operations, compounds employed and the like without departure from the scope of the invention. I intend to be limited only by the following patent claim.

I claim:

A nitration apparatus for the nitration of liquids wherein the reaction occurs at the interface of the acid and liquid to be nitrated, which comprises a reaction vessel, an elongated vessel of lesser diameter open at both ends, a mechanical agitator positioned to revolve within said elongated vessel, a shaft supporting said agitator, a plate above the upper open end of said elongated vessel a second mechanical agitator above said plate, and an inlet pipe opening substantially at the lower open end of the said elongated vessel.

JAMES B. CASTNER.

REFERENCES CITED

The following references are of record in the file of this patent:

UNITED STATES PATENTS

| Number | Name | Date |
| --- | --- | --- |
| 531,718 | Detwiler | Jan. 1, 1895 |
| 2,146,164 | Wirth | Feb. 7, 1939 |
| 2,254,352 | Cloud et al. | Sept. 2, 1941 |

Certificate of Correction

Patent No. 2,438,204. March 23, 1948.

JAMES B. CASTNER

It is hereby certified that error appears in the printed specification of the above numbered patent requiring correction as follows: Column 2, line 39, for "92000 pounds" read *9200 pounds*; and that the said Letters Patent should be read with this correction therein that the same may conform to the record of the case in the Patent Office.

Signed and sealed this 18th day of May, A. D. 1948.

[SEAL]

THOMAS F. MURPHY,
*Assistant Commissioner of Patents.*